(12) United States Patent
West et al.

(10) Patent No.: US 12,373,715 B2
(45) Date of Patent: Jul. 29, 2025

(54) RADIO FREQUENCY BAND SEGMENTATION, SIGNAL DETECTION AND LABELLING USING MACHINE LEARNING

(71) Applicant: DeepSig Inc., Arlington, VA (US)

(72) Inventors: Nathan West, Washington, DC (US); Tamoghna Roy, Arlington, VA (US); Timothy James O'Shea, Arlington, VA (US); Ben Hilburn, Reston, VA (US)

(73) Assignee: DeepSig Inc., Arlington, VA (US)

( * ) Notice: Subject to any disclaimer, the term of this patent is extended or adjusted under 35 U.S.C. 154(b) by 875 days.

(21) Appl. No.: 16/676,229

(22) Filed: Nov. 6, 2019

(65) Prior Publication Data

US 2020/0143279 A1    May 7, 2020

Related U.S. Application Data

(60) Provisional application No. 62/756,176, filed on Nov. 6, 2018.

(51) Int. Cl.
*G06N 7/01*  (2023.01)
*G06F 16/906*  (2019.01)
(Continued)

(52) U.S. Cl.
CPC ............ *G06N 7/01* (2023.01); *G06F 16/906* (2019.01); *G06N 3/047* (2023.01); *G06N 20/00* (2019.01); *H04B 17/0087* (2013.01)

(58) Field of Classification Search
CPC ...... G06N 7/005; G06N 3/0472; G06N 20/00; G06N 3/0445; G06N 3/0454; G06N 3/08;
(Continued)

(56) References Cited

U.S. PATENT DOCUMENTS

| 2017/0091597 A1* | 3/2017 | Wolfram | G06V 30/40 |
| 2017/0147940 A1* | 5/2017 | Mitola, III | G06N 20/00 |

FOREIGN PATENT DOCUMENTS

| GB | 2512093 A * | 9/2014 | G01S 7/021 |
| WO | WO-2018085425 A1 * | 5/2018 | G06K 9/4604 |

OTHER PUBLICATIONS

O'Shea et al., Convolutional Radio Modulation Recognition Networks, arXiv:1602.04105v3, Jun. 10, 2016, 15 pages (Year: 2016).*

(Continued)

*Primary Examiner* — Li B. Zhen
*Assistant Examiner* — Henry Nguyen
(74) *Attorney, Agent, or Firm* — Fish & Richardson P.C.

(57) ABSTRACT

Methods, systems, and apparatus, including computer programs encoded on computer storage media, for radio frequency band segmentation, signal detection and labelling using machine learning. In some implementations, a sample of electromagnetic energy processed by one or more radio frequency (RF) communication receivers is received from the one or more receivers. The sample of electromagnetic energy is examined to detect one or more RF signals present in the sample. In response to detecting one or more RF signals present in the sample, the one or more RF signals are extracted from the sample, and time and frequency bounds are estimated for each of the one or more RF signals. For each of the one or more RF signals, at least one of a type of a signal present, or a likelihood of signal being present, in the sample is classified.

22 Claims, 10 Drawing Sheets

(51) Int. Cl.
*G06N 3/047* (2023.01)
*G06N 20/00* (2019.01)
*H04B 17/00* (2015.01)

(58) Field of Classification Search
CPC . G06F 16/906; H04B 17/0087; H04B 17/309; H04B 17/382
See application file for complete search history.

(56) References Cited

OTHER PUBLICATIONS

O'Shea et al., Learning robust general radio signal detection using computer vision methods, published Oct. 1, 2017, 2017 51st Asilomar Conference on Signals, Systems, and Computers, Oct. 29 2017-Nov. 1, 2017, pp. 829-832 (Year: 2017).*

O'Shea et al., Spectral Detection and Localization of Radio Events with Learned Convolutional Neural Features, 2017 25th European Signal Processing Conference (EUSIPCO), Aug. 28 2017-Sep. 2 2017, pp. 331-335 (Year: 2017).*

Blazquez et al., Digital Architecture for an Ultra-Wideband Radio Receiver, 2003 IEEE 58th Vehicular Technology Conference, IEEE 2003, pp. 1303-1307 (Year: 2003).*

Redmon et al., YOLO 9000: Better, Faster, Stronger, arXiv:1612.08242v1, Dec. 25, 2016, 9 pages (Year: 2016).*

Kim et al., Markup SVG—An Online Content-Aware Image Abstraction and Annotation Tool, IEEE Transactions on Multimedia, vol. 13, No. 5, Oct. 2011, pp. 993-1006 (Year: 2011).*

Kinghorn, Donald, Easy Image Bounding Box Annotation with a Simple Mode to VGG Image Annotator, posted on Jun. 29, 2018, 5 pages (Year: 2018).*

Enrico Matei and Greg Harrison, Machine Learning for Wireless Spectrum Awareness, presented at GTC Washington DC conference, Oct. 2018, and archived at https://www.nvidia.com/en-us/on-demand/session/gtcwashingtondc2018-dc8116/ (retrieved Sep. 2, 2021) (Presentation).

Text transcript of Presentation transcribed from "Machine Learning for Wireless Spectrum Awareness", presented at GTC Washington DC conference, Oct. 2018 (Transcript).

Slides from Presentation, archived at https://www.exptechinc.com/wp-content/uploads/2018/10/mattei_harrison_ml_for_wireless_spectrum_awareness.pdf (retrieved Sep. 2, 2021) or alternatively at https://gtcwashingtondc2018.smarteventscloud.com/fileDownload/session/89FEF0D94715403DC66EA02C0342F76854356321E3AE497FC6EE9D43A6C553A9A7C91EF36E74A533393ED1B9AA2C4914/6C7E63BC3392469A6358E7690A01F81321F862A52C2215C3558AD4B7F91296EEC0202330D2CA82B69F8B11E63F1FC21AC6F5E8ECACD0B68A455DACBAD18307ACC641E544D38D854CB2FD95DEDBD25795.pptx?fileID=A99F9165E7F6C1AD3336ADE20AE9513E&userID=B868BDD2B8D41838DA0EAC0BE3523B.B5 (retrieved Oct. 11, 2021) (Slides). The Oct. 24, 2018 publication date of the Slides is available at https://gtcwashingtondc2018.smarteventscloud.com/connect/agenda.ww (retrieved Oct. 11, 2021).

* cited by examiner

RADIO FREQUENCY BAND SEGMENTATION, SIGNAL DETECTION AND LABELLING USING MACHINE LEARNING

CROSS-REFERENCE TO RELATED APPLICATION

This application claims priority to U.S. Provisional Application No. 62/756,176 filed on Nov. 6, 2018. The disclosure of this prior application is considered part of and is incorporated by reference in the disclosure of this application.

TECHNICAL FIELD

The present disclosure relates to radio frequency band segmentation, signal detection and labelling using machine learning.

BACKGROUND

Radio spectrum sensing is used for licensed spectrum enforcement and physical perimeter security. To perform radio spectrum sensing, in some cases, a portion of the radio frequency spectrum has to be sampled, to detect signals present in the radio sample. Sampling a portion of the radio frequency spectrum and detecting constituent signals can be challenging.

SUMMARY

The present disclosure describes methods, apparatus, and systems for learning and deploying radio frequency band segmentation, and signal detection and labelling. In some implementations, a system receives sampled energy from one or more radio receivers, detects and separates one or more signals from the received energy, estimates time and frequency bounds of the signals, and classifies, for the detected signals, a type of signal present, or likelihood of a signal being present, in the received energy.

In some implementations, the system includes a machine learning model that is trained using samples that are received from one or more radio receivers or simulated throughout a signal environment simulator and that are saved to a dataset. The dataset may be labelled as part of a dataset for training machine-learned models.

In some implementations, the system is trained using one or more training routines that include augmenting the sampled radio frequency signals and bands of multiple radio frequency signals to create a multitude of radio signal examples for training from one or more of received datasets or simulated datasets.

In some implementations, the training routines generate a machine learning model (referred to interchangeably as a "model") that can operate on radio receivers that emit signals at different sample rates than the radio examples used for training and that include various analog components. The model can be applied to one or more radio systems, including hardware and radio environment variations.

In some implementations, the system computes time and frequency boundaries as well as a signal type and likelihood prediction for the signals present in the sampled bandwidth.

In one general aspect, a method includes: receiving, from one or more radio frequency (RF) communication receivers, a sample of electromagnetic energy processed by the one or more receivers; examining the sample of electromagnetic energy to detect one or more RF signals present in the sample; and in response to detecting one or more RF signals present in the sample: extracting the one or more RF signals from the sample, estimating time and frequency bounds for each of the one or more RF signals, and classifying, for each of the one or more RF signals, at least one of a type of a signal present, or a likelihood of signal being present, in the sample.

Implementations may include one or more of the following features. For example, in some implementations, estimating time and frequency bounds for each of the one or more RF signals includes: transforming the sample of electromagnetic energy from a time-series representation to a time-frequency representation; determining the time bounds for each of the one or more RF signals based on the time-frequency representation; and determining the frequency bounds for each of the one or more RF signals based on the time-frequency representation.

In some implementations, transforming the sampled energy from a time-series representation to a time-frequency representation includes computing at least one of a fast Fourier transform (FFT), a digital Fourier transform (DFT), or a wavelet transform with the sampled energy.

In some implementations, classifying at least one of a type or likelihood of signal present for each of the one or more RF signals includes: comparing one or more of the time bounds or frequency bounds of each of the one or more RF signals with signal classification data; based on the comparing, determining that an RF signal of the one or more RF signals corresponds to one of one or more known types of signals; and classifying the signal as corresponding to the one or more known types of signals.

In some implementations, classifying at least one of a type of a signal present, or a likelihood of signal being present, in the sample includes classifying at least one of a type of a signal present, or a likelihood of signal being present, in the sample using a machine learning model.

In some implementations, the method further includes: annotating at least one of the time-series representation or the time-frequency representation with the at least one of a type or likelihood of signal present for each of the one or more RF signals; and storing the annotated representation.

In some implementations, the method further includes obtaining signal class probabilities; and generating one or more bounding boxes having a time dimension and a frequency dimension based on the signal class probabilities, each bounding box corresponding to at least one of a type of signal or a likelihood of a signal type present.

In some implementations, generating the one or more bounding boxes includes generating one or more bounding boxes based on output of a neural network or a clustering algorithm that receives the signal class probabilities as input.

In some implementations, the method further includes labelling each of the one or more bounding boxes with the corresponding one or more types.

In some implementations, generating one or more bounding boxes having a time dimension and a frequency dimension based on the signal class probabilities includes determining the likelihood of a signal type present for each of the one or more bounding boxes, where a likelihood for a bounding box indicates that the bounding box correctly represents a type of signal.

In some implementations, the method further includes labelling each of the one or more bounding boxes with the at least one corresponding likelihood.

In some implementations, classifying at least one of a type or likelihood of signal present includes, for each of the one or more RF signals: comparing the time bounds and the frequency bounds of the RF signal with the one or more bounding boxes; determining that the time bounds and the frequency bounds of the signal are within a threshold range of a bounding box of the one or more bounding boxes; and in response to the determination, classifying the signal as at least one of a type of RF signal corresponding to the bounding box, or with a likelihood of a signal type present corresponding to the bounding box.

In one general aspect, a method includes: receiving a training data set including a plurality of time-series radio frequency (RF) signal samples; generating a training vector from the plurality of time-series signal samples; generating one or more new training vectors by modifying the plurality of time-series signal samples; and using the training vector and the one or more new training vectors to train a machine learning model for at least one of RF band segmentation, RF signal detection, or RF signal labelling.

In some implementations, generating one or more new training vectors by modifying the plurality of time-series signal samples includes applying one or more of a linear impairment, a non-linear impairment, a frequency shift, an interference addition, a wideband filter, a frequency reverse, or a band elimination to the plurality of time-series signal samples.

In some implementations, the method further includes determining at least one of an electromagnetic environment in which the machine learning model is to be deployed, or hardware components that are to be used in deploying the machine learning model, where generating one or more new training vectors by modifying the plurality of time-series signal samples includes modifying the plurality of time-series signal samples based on the electromagnetic environment in which the machine learning model is to be deployed, or the hardware components that are to be used in deploying the machine learning model.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions described herein. One or more computer programs can be so configured by virtue of having instructions that, when executed by data processing apparatus, cause the apparatus to perform the actions.

The techniques described herein can be implemented to achieve one or more of the following improvements and advantages. For example, the systems and methods described herein can improve detection, segmentation, separation, and classification of signals transmitted using electromagnetic energy. This can, in turn, improve the efficiency of spectrum enforcement and physical perimeter security by, for example, improving the accuracy of signal detection, reducing the number of false positives, reducing the number of false negatives, improving the accuracy of identifying a source of a detected signal, reducing the time used to identify a source of a detected signal, or any suitable combination of these.

The augmentation techniques described herein can reduce the need for a large dataset and enable a trained machine learning model to be deployed to different radio systems or radio environments. For example, the model trained by the disclosed augmentation techniques can perform well with radio receivers that (i) are different from the radio receivers used to create the training dataset, (ii) can run at different sample rates, gain values, center frequencies, and/or (iii) in different radio bands and geographical areas, which may have different spectrum utilization and band-plans or other effects.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
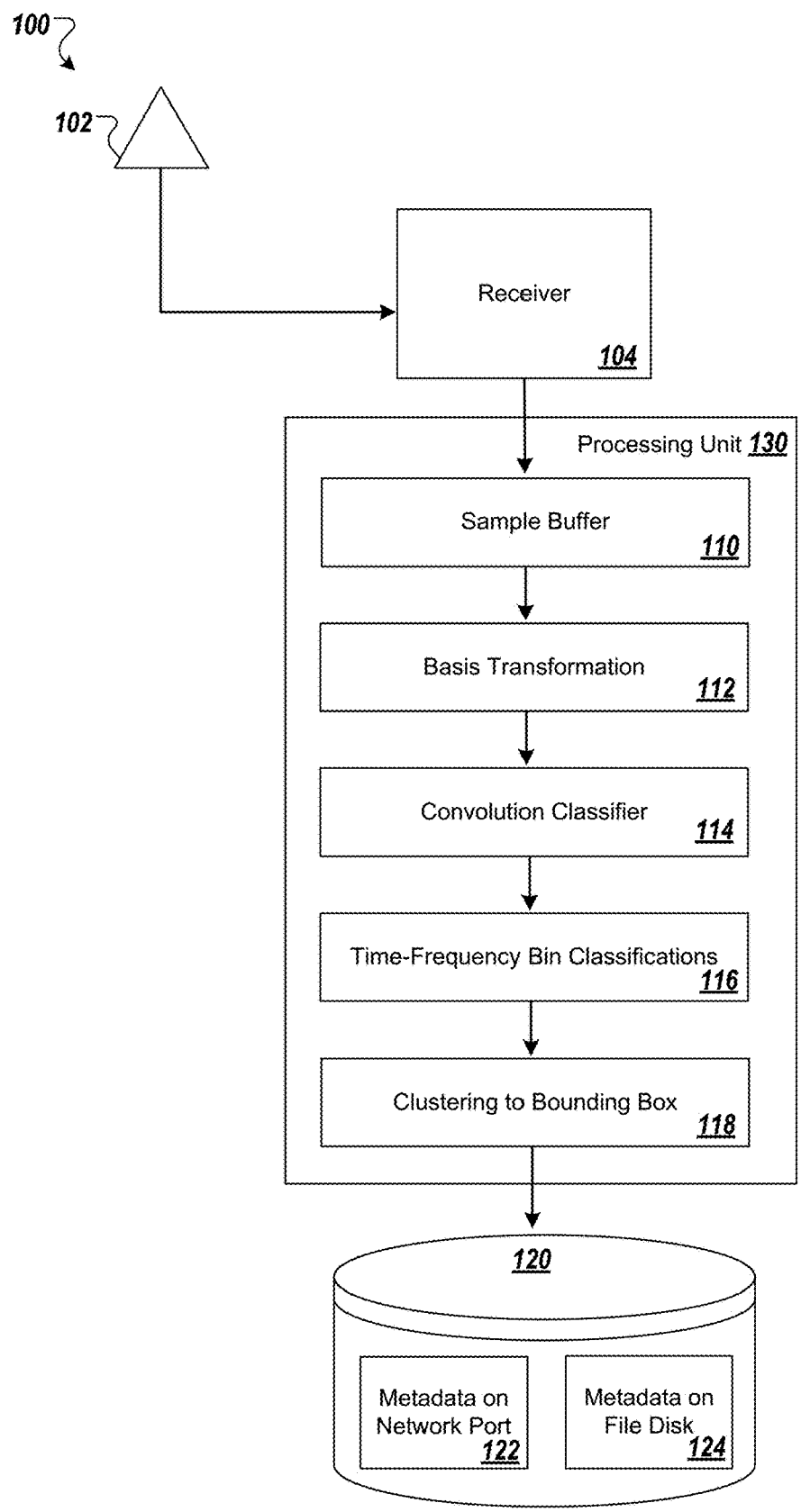
FIG. 1 illustrates an example system for learning and deploying radio frequency band segmentation, and signal detection and labelling.

Systems and techniques are disclosed herein detect, separate, and classify signals by operating on a time-frequency basis. In some implementations, a system includes a trained machine learning ("ML") model such as a neural network, and uses the ML model in detecting, separating, and/or classifying the signals. The time-frequency basis may be a spectrogram computing technique using a discrete Fourier transform or other matrix-transformation methods. The ML model may be trained to output probability for each time-frequency bin that a particular type of signal is present in that bin, resulting in a grid of bins. The grid of bins can then be processed into bounding boxes by locating regions of similar signal probabilities.

In some implementations, the system uses another ML model, such as a second neural network, for bounding box regression, or an argmax of each pixel can be clustered into groups using a clustering method such as connected components labelling. The bounding boxes can then be transformed to time and frequency boundaries that include, for example, the time, length, center frequency, and bandwidth of radio emission by using knowledge of receiver settings that describe the input sampled signal's bandwidth, center frequency, timing, and sample rate.

The ML models may be trained using a large amount of data that is correctly labelled. In some implementations, the system performs labeling and augmentation routines that process sampled radio data to label unlabeled training examples and to create a greater number of training examples using one or more training examples, e.g., by introducing variations to the training examples or combining the training examples. The augmentation techniques reduce the need for a large dataset and enable the trained model to be deployed to different radio systems or radio environment. For example, the model trained by the disclosed augmentation techniques can perform well with radio receivers that are different than the radio receivers used to create the training dataset and that run at different sample rates, gain values, center frequencies, and in different radio bands and geographical areas, which may have different spectrum utilization and band-plans or other effects.

In some related examples, detection and classification of signals may be separately treated using features of expected signals such as energy integration, clustering, or peak detection for signal detection, and cyclostationary or higher order moment processing for classification.

In some implementations, the ML models or networks of the system may be trained adversely, e.g., adversely optimized, such that the objective functions of one or more models/networks compete with the objective function of a different model/network. In some implementations, training the ML models or networks includes adversely optimizing one or more of the models/networks iteratively with a different model/network. In some implementations, training the ML models or networks includes optimizing one or more of the models/networks jointly with a different model/network.

During training, one or more of the ML models or networks may be trained to perform unsupervised, or partially supervised, ML. One or more of the models/networks can be trained on real or simulated conditions, e.g., real or simulated radio signals. One or more of the models/networks that utilize results of training such ML models or networks may further be updated during deployment, thus providing advantages in adapting to different types of wireless system requirements, and in some cases improving the throughput, error rate, complexity, and power consumption performance of such systems.

The disclosed implementations present a novel approach to detecting and classifying signals present in a radio sample. For example, the disclosed implementations may help improve the efficiency of spectrum enforcement and physical perimeter security by, for example, improving the accuracy of signal detection, reducing the number of false positives, reducing the number of false negatives, improving the accuracy of identifying a source of a detected signal, reducing the time used to identify a source of a detected signal, etc.

Implementations disclosed herein may be applied to a wide range of radio communication systems, such as cellular, satellite, optical, acoustic, physical, emergency handheld, broadcast, point-to-point, Wi-Fi, Bluetooth, and other forms of radio.

FIG. 1 illustrates an example system 100 for learning and deploying radio frequency band segmentation, and signal detection and labelling. The system 100 includes an antenna 102, a receiver 104, a processing unit 130 that can perform a variety of signal operations, and data storage 120.

The receiver 104 may be a radio receiver. The receiver 104 may include one or more of analog bandpass filters, mixers, tuners, analog-to-digital converters (ADC), digital processing, or digital distribution systems such as Vita49 or SDDS, among others.

The processing unit 130 may include one or more computer processors (e.g., CPUs, GPUs, or the like). The processing unit 130 may be part of one or more computers or servers.

The data storage 120 may include RAM, SDD, HDD, shared memory, cloud storage, among others. The data storage 120 may be local with respect to the processing unit 130. The data storage 120 may be remote with respect to the processing unit 130.

The system 100 may receive energy, such as radio waves or signals, through the antenna 102 and the receiver 104. For example, one or more radio waves can impinge the antenna 102, and are then received by the receiver 104. The receiver 104 may provide this energy to the processing unit 130. In some implementations, the receiver 104 samples the energy and sends the sampled energy to the processing unit 130.

The processing unit 130 may pass the energy it receives from the receiver 104 through a sample buffer 110, sampling the energy and producing sampled data. The sample buffer 110 is a memory for energy received from the receiver 104. The sample buffer 110 may be a time-series sample buffer.

The processing unit 130 then performs a basis transformation function 112 on the sampled data. Performing the basis transformation function 112 on the sampled data, a time-domain signal, produces a new representation of the sampled data, the representation having at least two dimensions. For example, one of the dimensions can be time and the other, frequency. In some examples, the basis transformation function 112 is a fast Fourier transform (FFT). The processing unit 130 may perform an FFT or other known methods to convert the sampled data, e.g., an input time-domain signal, into a series of spectral power estimates at different time offsets. In other examples, the basis transformation function 112 is another method such as an approximate learned transformation that performs a processing with a series of learned filter taps is used to translate the sampled data, e.g., an input time-domain signal, into a pseudo-time-frequency representation.

In some implementations, the representation of the sampled data resulting from the basis transformation function 112 has additional dimensions. These additional dimensions can include, for example, sample magnitudes, phase, or learned features.

In some implementations, the processing unit 130 does not perform the basis transformation function 112. In these implementations, the processing unit 130 may pass the sampled data directly to a convolution classifier 114.

The processing unit 130 inputs the representation of the sample data to the convolutional classifier 114 that provides classifications or value regression, such as pseudo-probability, of each class or type of signal for each time-frequency bin within time-frequency bin classifications 116, or each time-frequency bin in an alternate 2-dimensional space. The convolution classifier 114 may have a fixed architecture that is discussed in more detail below with respect to FIG. 3. The convolution classifier 114 may indicate information about the signals present in the sampled data. For example, the convolution classifier 114 may indicate the standards of the signals present, e.g., LTE, Wi-Fi, or the like. Similarly, the convolution classifier 114 may indicate the different signal traffic types, e.g., audio, streaming video, or the like.

The time-frequency bin classifications 116 classify the emissions. Each time-frequency bin may be a fixed increment or step size in the time-frequency domain having a time bounds or edges, and frequency bounds or edges. Similar time-frequency bin classifications can be clustered in time-frequency domain with each cluster having a time-bound or edges and frequency bound or edges. The classifications may determine a single class value or a probability distribution over a set of classes, e.g., signal types. In some implementations, the time-frequency bins might not have any values. The output of the time-frequency bin classifications 116 may include some predication, such as a determination if something is present (e.g., on or off).

In some implementations, the convolutional classifier 114 includes a neural network having one or more convolutional layers as will be discussed in more detail below with respect to FIG. 3.

The processing unit 130 performs clustering on the classification output, e.g., the output of the time-frequency bin classification 116, to one or more bounding boxes 118. That is, the processing unit 130 may fuse the classification output across the time-frequency bins into time and frequency edges. In clustering the classification to one or more bounding boxes 118, the processing unit 130 may determine if any of the signals present within the sampled data are fall within any of the bounding boxes, or are substantially within any of the bounding boxes. If a signal present within the sampled data falls within or substantially within a bounding box, the processing unit 130 may associate the corresponding signal, the sampled data, and/or the energy from the receiver 104 with the classification and/or value regression, such as pseudo-probability, of the bounding box.

As an example, where there is 2.4 Ghz (Gigahertz) and Wi-Fi traffic, the processing unit 130 generates a grid of 100 Mhz (Megahertz) across that band. In clustering to one or more bounding boxes 118, the processing unit 130 may predict an on or off for each pixel in the grid, and group together different bins. In clustering to one or more bounding boxes 118, the processing unit 130 may use a connected components algorithm.

In some implementations, the processing unit 130 does not perform clustering to one or more bounding boxes 118.

The processing unit 130 may save this classification and/or value regression as metadata and may store it on the data storage 120. For example, the processing unit 130 may transfer the matched classification and/or value regression data to one or more external devices through a network port as metadata 122. The processing unit 130 may save the matched classification and/or value regression data locally on a file disk as metadata 124.

In some implementations, the metadata 122 and/or 124 are annotations. The metadata 122 and/or 124 may be annotations that are attached to or saved with the corresponding signal (e.g., which may have been separated from the sampled data through signal segmentation), the sampled data, and/or the energy from the receiver 104.

The system 100 can be used for streaming wideband RF signal detection, mapping, L1 statistics monitoring, and analysis. For example, the system 100 may be used for mapping applications in order to locate and map radio emitters, and/or the type of signals that are produced by those emitters. This may be done by moving the system 100 through an area where the locations of radio emitters are unknown, an area that has not been checked in a given amount of time, an area where radio emitters are suspected of being located, or the like. For example, the system 100 may be deployed on one or more vehicles that travel through particular areas while the system 100 collects data on those areas, e.g., electromagnetic energy through one or more antennas and receivers. The locations of the emitters and/or the types or class of signals produced by the emitters may be annotated on a map of the area searched. As described in more detail below, this may be useful for identifying radio emitters that are operating unlawfully or otherwise without permission. This may be useful for identifying areas for cellular planning and predication, e.g., to identify areas where a cellular signals are weak which may indicate a good location for a cell tower.

As another example, the system 100 may be used by a company to determine if their band is getting any usage or adequate usage, to identifying locations of base stations, to indirectly identify roads near base stations, and again to identify emitters where there should not be any.

The system 100 is also particularly helpful in cellular planning and predication. For example, a telecommunications company could use the system 100 for 5G coverage mapping, to quickly measure power levels in an area, to quickly detect interference and identify the sources of the interference, or the like. In addition, a telecommunications company may use the system 100 for propagation mapping. For example, if the telecommunications company is looking for new tower locations, they could use the system 100 to determine band in the area, the emissions in the area, or the like.

The system 100 may also be used for anomaly detection. For example, the system 100 may be used to identify emitters that are operating unlawfully or otherwise without permission, such as unauthorized base-stations. Such information could be used to warn people or to take mitigating actions.

The system 100 can be used for radar detection.

The system 100 may be a handheld or otherwise mobile system. For example, the system 100 may be handheld tool that customers or user could bring into the field to collect data. As another example, the system 100 could be a mobile system for various vehicle applications, e.g., the system 100 could be fixed to an automobile, an aircraft, or a marine vessel, among others. The system 100, may be used by the customers or users to detect interferences in the field, to detect failing hardware (e.g., failing emitters), or the like.

The system 100 can be used for defense applications. For example, the system 100 may be used to detect communication systems in various vehicles (e.g., automobiles, aircraft, or the like), detect UAVs, discover radar, or detect electronic warfare (EW) such as jamming or attempted jamming. Accordingly, the system 100 can be integrated as part of a rapid warning or response system.

Figure 2:
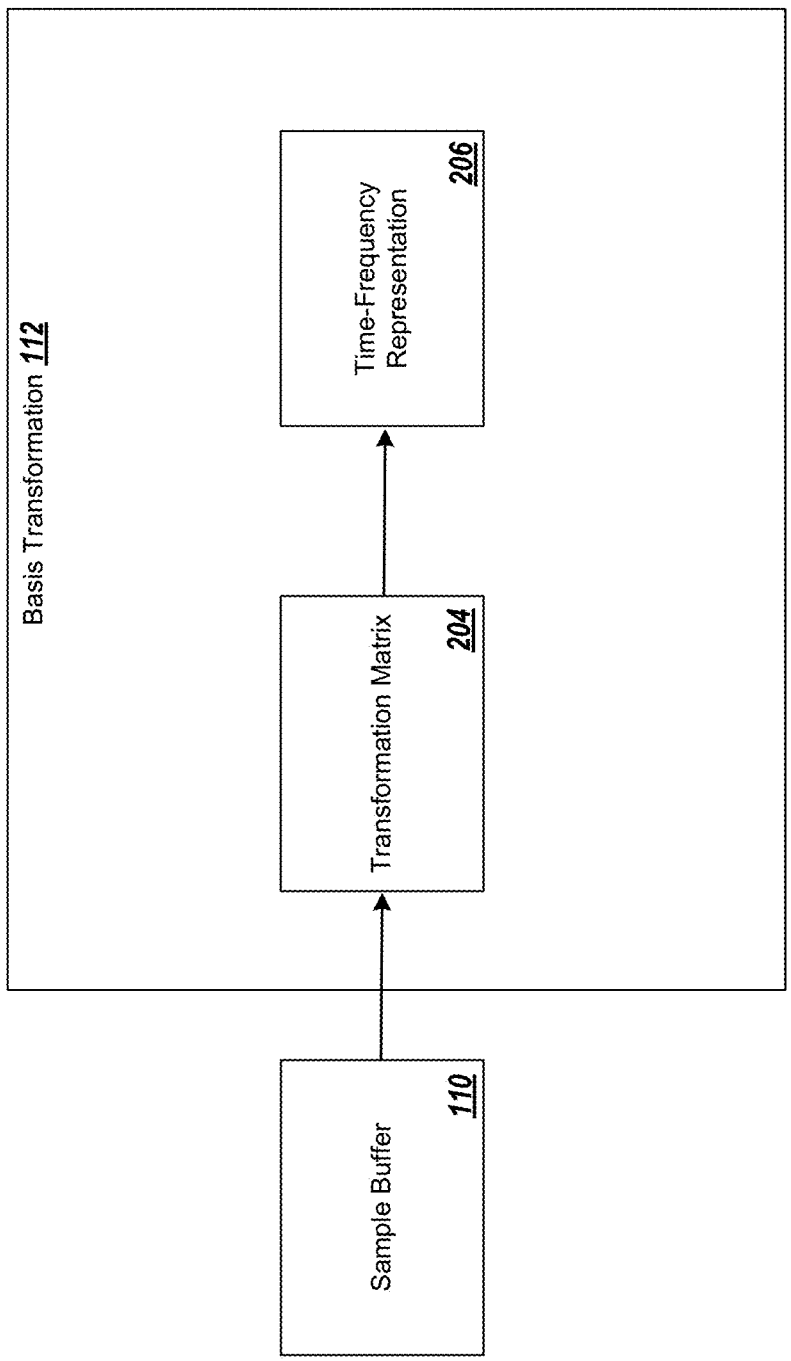
FIG. 2 illustrates an example diagram of a basis transformation.

FIG. 2 illustrates an example diagram of the basis transformation function 112. As shown, the basis transformation function 112 includes a transformation matrix 204. The basis transformation function 112 receives the sampled data from the sample buffer 110, and output a time-frequency representation 206.

The transformation matrix 204 transforms the time-series sampled data to a time-frequency representation 206 of the signal. For example, the transformation matrix 204 takes the place of expertly placed weights in a Vandermonde matrix to compute digital Fourier transforms (DFTs) (e.g., which may be strided, computed as FFTs, or other similar transforms) to determine the time-frequency representation 206 corresponding to a spectrogram, or another projection of time signals such as time-wavelet representations.

In some implementations, the transformation matrix 204 may include weights that are trainable as part of a training process for the convolutional classifier 114 shown in FIG. 1 for a learned task-specific time-frequency representation, e.g., the time-frequency representation 206.

In some implementations, the transformation matrix 204 includes a DFT Vandermonde matrix that provides a complex time-frequency representation, e.g., the time-frequency representation 206. The complex numbers can be treated as a depth of two (one for real and one for imaginary parts). In some examples, a combination of the phase and/or magnitude of the complex number could also be used for a depth of one or two.

The transformation matrix 204 can also be trained as part of the convolutional classifier 114 shown in FIG. 1 so that a learned time-frequency representation is used. For example, the transformation processing of the basis transformation function 112 may be part of the convolution classifier 114, so that the transformation processing and convolutional detection and classification take the form of a signal for a large neural network or large tightly coupled set of tensor or matrix operations. The transformation matrix 204 may also take the case of one or more Fast Fourier transforms (FFTs), for example, to produce a spectrogram.

In some instances, the transformation processing and the convolutional detection and classification neural network may be implemented on two or more processors. For example, they may be implemented on an Intel processor to compute the spectrograms and an NVidia GPU to compute the neural network. In other instances, both operations may be computed on the same processors, for example, an NVidia GPU to compute both the time-frequency representation 206 and the convolutional network providing bin detections and probabilities on the same device, which may provide enhanced power or other performance efficiencies.

Figure 3:
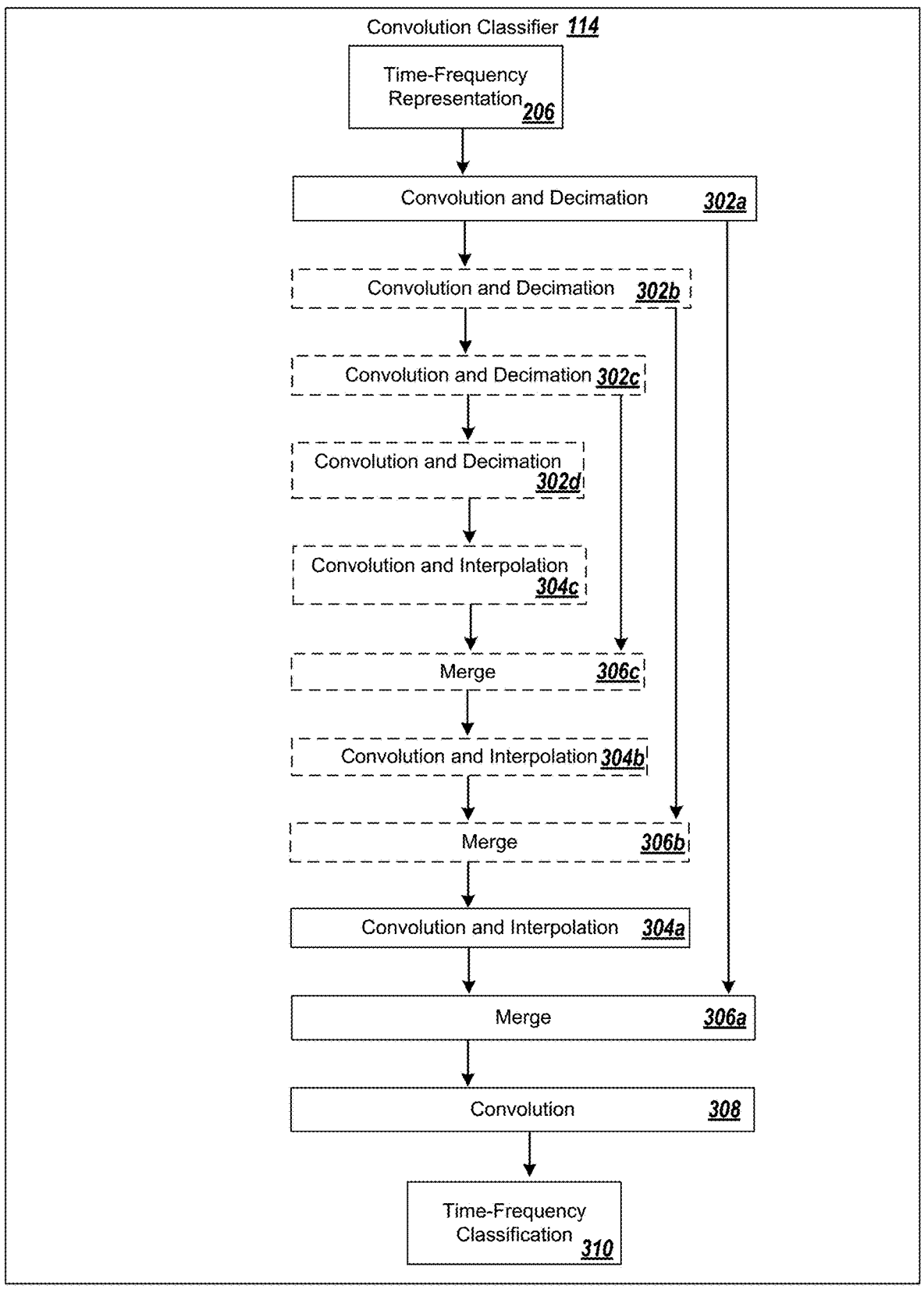
FIG. 3 illustrates an example diagram of a convolution classifier.

FIG. 3 illustrates an example diagram of the convolution classifier 114. Specifically, FIG. 3 illustrates an example network topology of the convolutional classifier 114.

The convolution classifier 114 may receive the time-frequency representation 206 as shown in FIG. 2. The convolution classifier 114 can classify the time-frequency representation 206 into signal types and noise using one or more convolution layers 302a-302d, 304a-304c, and 308, and one or more merge layers 306a-306c. The convolution classifier 114 may be a ML model such as a neural network. The convolution classifier 114 may indicate information about the signals present in the sampled data, e.g., as represented by the time-frequency representation 206. For example, the convolution classifier 114 may indicate the standards of the signals present, e.g., LTE, Wi-Fi, or the like. Similarly, the convolution classifier 114 may indicate the different signal traffic types, e.g., audio, streaming video, or the like.

As shown, the convolution classifier 114 includes a first convolution and decimation layer 302a, a first convolution and interpolation layer 304a, a first merge layer 306a, and a convolution layer 308. The convolution classifier 114 optionally includes a second convolution and decimation layer 302b, a third convolution and decimation layer 302c, a fourth convolution and decimation layer 302d, a second merge layer 306b, a second convolution and interpolation layer 304b, a third merge layer 306c, and/or a third convolution and interpolation layer 304c.

In some implementations, the convolution classifier 114 includes a single convolution layer, e.g., the convolution layer 308.

In the described convolution classifier 114 network, convolutional features from early layers such as the first convolution and decimation layer 302a may be forwarded through the network to be merged, e.g., at merge layer 306a, and decimated for the following convolution and decimation layer 302b. Several stages of convolution and decimation, e.g., through convolution and decimation layers 302b-302d, allow multiple scales of features and context to be learned while the later stage convolutions, e.g., convolution and interpolation layers 304a-304c and convolution layer 308, build richer feature sets by combining the multiple scales from downsampled features as well as non-downsampled features from the merge layers 306a-306c.

The merge layers 306a-306c can either concatenate or sum feature sets. The merge layers 306a-306c enable the system 100 shown in FIG. 1 to learn features and to determine feature-maps and structure at a wide range of time-frequency resolutions effectively.

The resulting time-frequency classification 310 provides a probability distribution, or pseudo-probability values, for each time-frequency bin over the set of signals or classes being trained for detection/identification. In this manner, the convolutional classifier 114 classifies each time-frequency bin.

In some implementations, the convolution classifier 114 outputs more than a single classification.

In some implementations, the dimensions of the output time-frequency classification 310 match the dimensions of the input computed time-frequency representation 206, but have a depth of the number of signal types or classes in the training set plus one for background.

In some instances, the convolution classifier 114 produces additional outputs. For example, the convolution classifier 114 may produce a probability of detection output for any classes (e.g., a detection probability regression) or types of signals. An additional output of the convolution classifier 114 could also have a depth of one for whether a signal or no signal is present. This would allow received signals that are not in the training dataset to be detected as unknown signals. In such cases, the convolution classifier 114 may be a multi-headed classifier.

In some implementations, the convolution classifier 114 produces an output other than the time-frequency classification 310 that can be trained to detect a signal or noise. This output can be trained jointly or independently from the time-frequency classification 310 output or various hierarchies of class labels, for example, high level labels such as a QAM label or PSK label and more specific labels such as QAM16 or PSK8. In some examples, multiple classes in the hierarchical or multi-label classification output may be active at any one time during training, and multiple labels may be determined about the emissions when deployed at inference time.

In some implementations, the architecture of the convolution classifier 114 is fixed. For example, the number of convolution layers included in the convolution classifier 114 may be chosen beforehand. The number of convolution layers to include in the convolution classifier 114 may be selected for a particular goal, or for particular type or class of signals. For example, the number of convolution layers to include in the convolution classifier 114 may be selected to work well with many different types or classes of signals. As another example, the number of convolution layers to include in the convolution classifier 114 may be selected to work well with a specific type or class of signal, such as particular signal standards (e.g., LTE, Wi-Fi, or the like) or particular signal traffic (e.g., audio, streaming video, or the like).

The number of convolution layers to include may be automatically selected, e.g., by a machine learning model during the training period based on training data. The number of convolution layers to include may be manually selected.

In some implementations, the architecture of the convolution classifier 114 is selected at runtime. For example, the number of convolution layers included in the convolution classifier 114 may be automatically selected, e.g., by a machine learning model, at runtime. The selection may be dynamic. For example, the selection may be based on the location of the system, the expected type of signal (e.g., LTE, Wi-Fi, or the like), the expected type of signal traffic (e.g., audio, streaming video, or the like), the hardware used by the system, the electromagnetic environment that the system is located in, or the like.

Figure 4A:
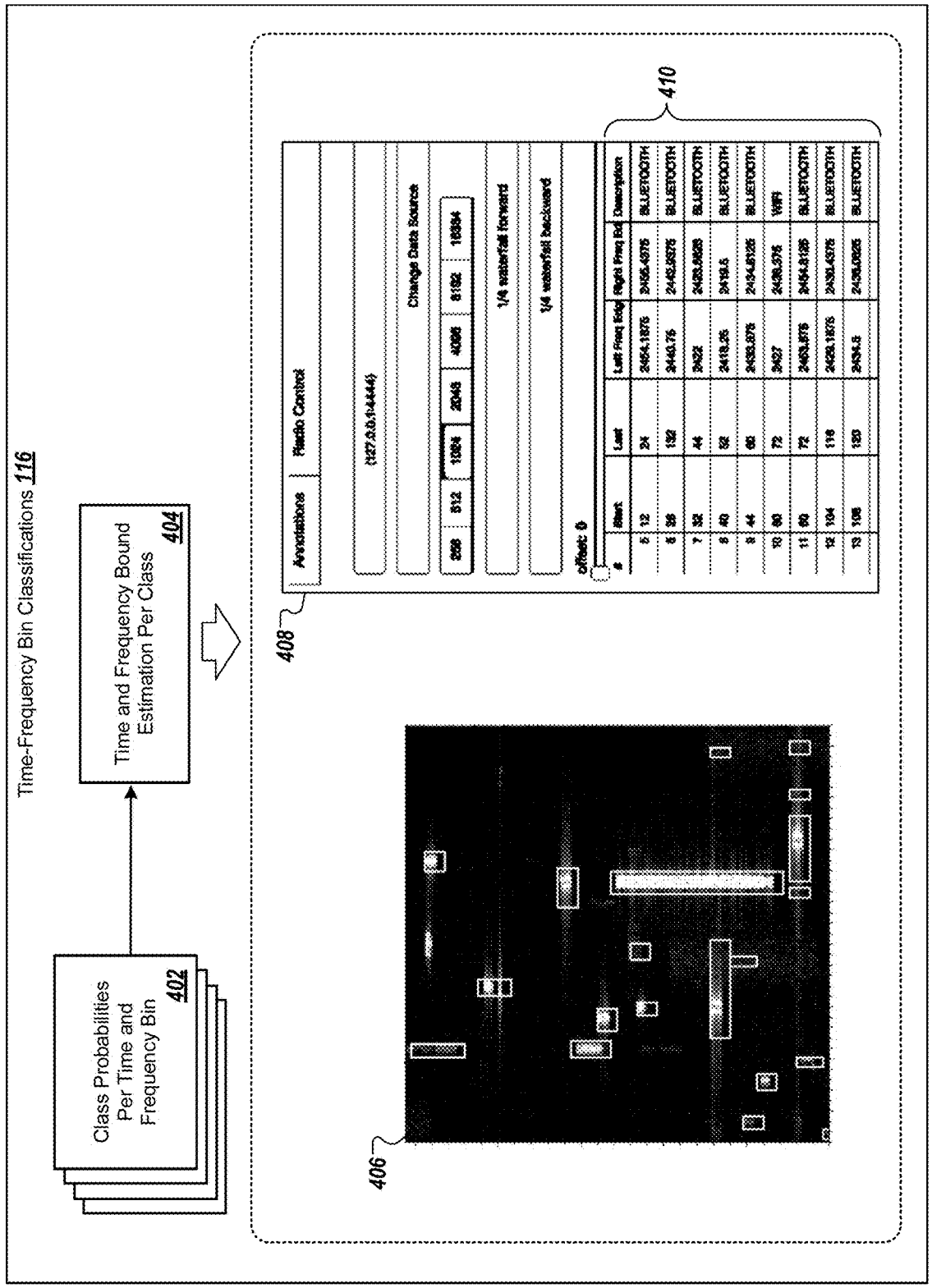
FIG. 4A illustrates an example diagram of time-frequency classifications.

FIG. 4A illustrates an example diagram of the time-frequency bin classifications 116. An example of time-frequency bin classifications 116 to bounding box parameters is shown as an example of clustering to bounding box 118 of FIG. 1.

Bounding boxes describe one or more signals that are present within a given time-frequency representation of sampled data. Each of the bounding boxes may correspond to a type or class of signal, time boundaries, and frequency boundaries.

The system 100 shown in FIG. 1 may use the of class probabilities per time and frequency bin 402 to perform time and frequency bound estimation per class (404). That is, the system 100 may use the class probabilities per time and frequency bin 402 to generate bounding boxes in a time-frequency representation 406 around numerous signals present within the time-frequency representation 406. Each of the signals may be labelled with a signal type or multiple of the most-likely signal types based on the signal type(s) of the corresponding bounding box.

Figure 4B:
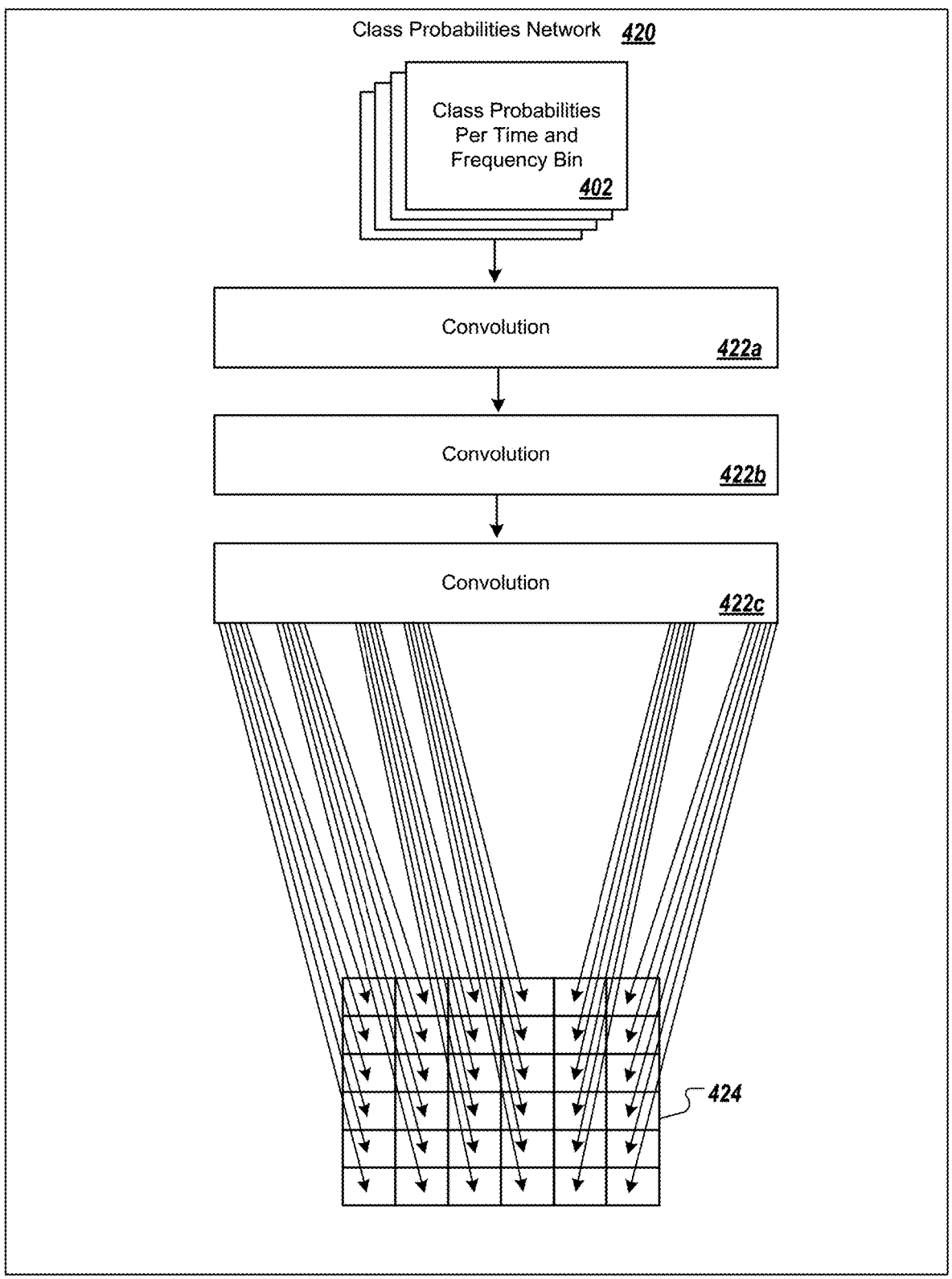
FIG. 4B illustrates an example diagram of a network used in a time-frequency classification.

In some implementations, the class probabilities per time and frequency bin 402 is a grid of pseudo-probabilities, e.g., the grid 424 shown in FIG. 4B. In these implementations, the system 100 may use the grid in performing the time and frequency bound estimation per class (404).

In some implementations, the time-frequency representation 406 is the time-frequency representation 206 shown in FIG. 2. In some implementations, the time-frequency representation 406 is a spectrogram.

Numerous approaches may be used in performing time and frequency bound estimation per class (404), e.g., to estimate bounding boxes from the class probabilities per time and frequency bin 402. For example, the approaches may include regression using a neural network that may include one or more of you only look once (YOLO) object detection, single shot multibox detection (SSD), recurrent convolutional neural network (RCNN), or Faster-RCNN, or the like. In some examples, the approaches may include clustering algorithms such as connected components or modified versions of connected components to combine aspects of expected signal shaping, or other forms of clustering algorithms such as density-based spatial clustering of applications with noise (DBSCAN), K-Means, k-nearest neighbors (k-NN), or the like. In some instances, the same processing stages may be used on energy or other signal representations to generate labels to be used in training data as well.

An example bounding box 412 can be drawn around a signal present within the time-frequency representation 406. The bounding box 412 may be drawn automatically, e.g., using edge detection. The bounding box 412 may be drawn based on input received, e.g., mouse input, touch input, or keyboard input. As an example, the bounding box 412 may be automatically drawn and is then adjusted based on received input.

Based on drawing the bounding box 412 and/or one or more of the other bounding boxes, the system 100 shown in FIG. 1 may generate a user interface 408 having a list of known signals 410 or may populate the user interface 408 with the list of known signals 410. The list of known signals 410 includes a signal type or class (e.g., "Bluetooth" or "Wi-Fi"), time edges ("Start" and "Last"), and frequency edges ("Left Freq. Edge" and "Right Freq. Edge"). As an example, the list of known signals 410 may be generated based on the drawn time and frequency dimensions of the bounding box 412. The list of known signals 410 may be those signals that have time-frequency dimensions that match, substantially match, or are the most similar to the dimensions of the bounding box 412 or match signal signatures of emissions within other similar bounding boxes. The system 100 may automatically associate the bounding box 412 and the corresponding signal with each of the matching signals in the list of known signals 410, with the most similar signal within the list of known signals, or with a number (e.g., two, three, or five) of the of the most similar signals in the list of known signals 410. In associating the bounding box 412 and the corresponding signal with the one or more signals in the list of known signals 410, the system 100 may label the bounding box 412 and/or the corresponding signal with the type(s), time edges, and/or frequency edges of the one or more signals in the list of known signals 410.

In some implementations, the system 100 shown in FIG. 1 or a different system may provide a visualization of the output bounding boxes, including the bounding box 412. For example, the system 100 may display the bounding boxes overlaid on the time-frequency representation 406 as shown. As another example, the system 100 may display a table that enumerates information about the detected signals and their respective properties such as time, length, frequency, bandwidth, type, and RSSI, among others.

Numerous approaches for (402) may be used to estimate bounding boxes from the grid of pseudo-probabilities (401). For example, the approaches may include regression using a neural network that may include one or more of YOLO, SSD, RCNN, or Faster-RCNN, or the like. In some examples, the approaches may include clustering algorithms such as connected components or modified versions of connected components to combine aspects of expected signal shaping, or other forms of clustering algorithms such as DBSCAN, K-Means, k-NN, or the like. In some instances, the same processing stages may be used on energy to generate labels to be used in training data as well.

FIG. 4B illustrates an example diagram of a network 420 used in a time-frequency classification. The class probabilities network 420 performs transformation of the class probabilities per time and frequency bin 402 in the time-frequency space to bounding boxes in the time and frequency bound estimation per class (404) of FIG. 4A.

The class probabilities network 420 includes one or more convolution layers 422a-422c. The class probabilities network 420 learns time and frequency bounding boxes from the class probabilities per time-frequency bin 402. The convolution layers 422a-422c are trained to output a number of bounding box predictions in a grid 424. The number of boxes to be predicted is determined by setting a grid size in the time-frequency space and predicting one or more boxes for the grid 424. The predictions may include an x, y offset within the grid cell of the grid 424 and x, y width of the predicted bounding box that includes the signal type and probability that the bounded signal type is correct.

In some implementations, the class probabilities network 420 may also output a likelihood associated with the presence of each bounding box, and/or a class or set of multiple class labels associated with the bounding box.

Figure 5:
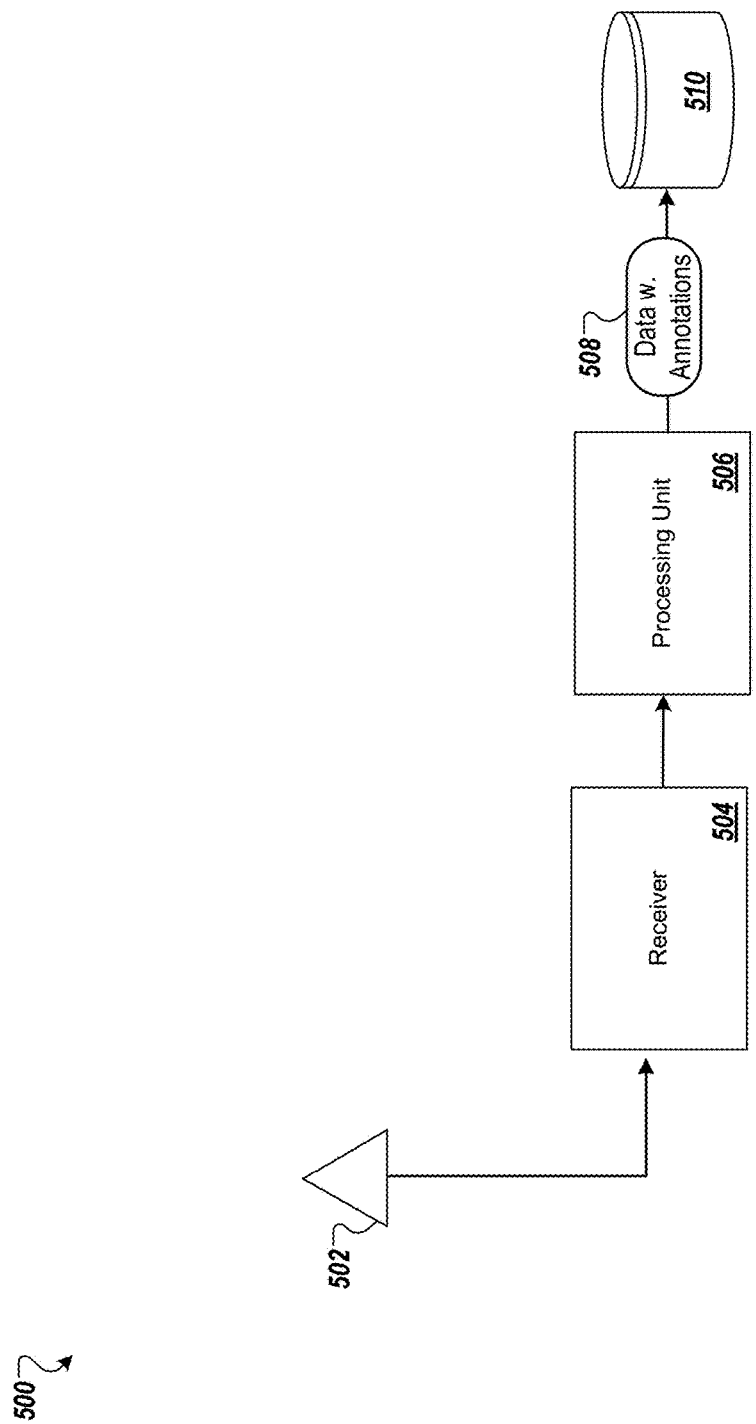
FIG. 5 illustrates an example system for signal detection and labelling

FIG. 5 illustrates an example system 500 for signal detection and labelling. The system 500 includes an antenna 502, a receiver 504, a processing unit 506, and data storage 510. The receiver 504 may be radio receiver such as a universal software radio peripheral (USRP). The processing unit 506 may include one or more CPUs and/or GPUs. In some implementations, the system 500 is the system 100 shown in FIG. 1. In some implementations, the antenna 502 is the antenna 102 shown in FIG. 1. In some implementations, the receiver 504 is the receiver 104 shown in FIG. 1. In some implementations, the processing unit 506 is the processing unit 130 shown in FIG. 1. In some implementations, the data storage 510 is the data storage 120 shown in FIG. 1.

The system 500 may run wideband detection, segmentation, and classification with the antenna 502, the receiver 504 (e.g., a USRP device), and the processing unit 506. Through the antenna 502 and the receiver 504, the processing unit 506 may receive energy such as radio waves and signals. The processing unit 506 may emit data with annotations 508 describing signals in a sample frequency spectrum, e.g., a sampled bandwidth over a network port. The data with annotations 508 may include labels corresponding with a bounding box and/or a bounded signal. For example, the data with annotations 508 may include a type or class of signal, the time bounds of the bounded signal or corresponding type of signal, the frequency bounds of the bounded signal or corresponding type of signal, and/or the probability that the bounded signal type is correct. The data with annotations 508 may additionally include a time-frequency representation of sampled data with the bounded signal present, such as a spectrogram. The time-frequency representation may be overlain with one or more bounding boxes.

In some implementations, the processing unit 506 includes one or more processors, such as an ARM processor, and one or more GPUs. As an example, the processing unit 506 may use the process for radio control and time-frequency transformation, while using one or more GPUs to conduct a neural network for inference of the bin probabilities.

The system 500 may stream the data with annotations 508, e.g., annotations as well as spectrograms, for visualization and/or post-processing. In streaming the data with annotations 508, the system 500 may use a Signal Metadata Format (SIGMF). Through the SIGMF, the system 500 may stream the data with annotations 508 over an Ethernet connection, a Wi-Fi connection, or the like.

The system 500 may be a recording system to build a dataset. For example, the receiver 504 may use the antenna 502 to record different frequency bands, resulting in sampled data. The processing unit may generate annotations for the sampled data or the raw data, and transfer the data with annotations 508 to the data storage 510. The annotations within the data with annotations 508 may describe the signals present in the sampled data, and may be generated and/or added to the sampled data by the processing unit 506 through leveraging of one or more existing band plans or through use of signal processing and analysis techniques.

The processing unit 506 can generate the annotations and/or add the annotations to the sampled data in a number of different ways, ranging from fully manual to fully automated. In the manual case, time and frequency bounds as well as signal type or class labels may be specified for each signal burst present within the sampled data by a user of the system 500. The user may input this information by, for example, clicking and drawing boxes over regions of a spectrogram generated from the sampled data and leveraging knowledge or feedback from other users to validate ground truth.

In some implementations, the processing unit 506 may use energy detection to localize the signal bursts of information present within the time-frequency spectrum (e.g. where energy is present for bursts). For example, the energy detection may leverage any number of filtering, smoothing, integration, or other signal processing techniques to improve the localization of emission bounds within the time-frequency spectrum.

In some examples, in using energy detection, the processing unit 506 leverages other techniques such as compression or wavelet representation prior to the detection stage. In some implementations, unsupervised segmentations may be used to partition the unlabeled input data or sample data into regions which may be rapidly labeled and converted into labels. For examples, the unlabeled input may be labeled using edge detection, pattern recognition approaches, or other unsupervised segmentation routines. In some instances, the system 500 leverages time-frequency bin classifications 116 and/or clustering to bounding box 118 techniques described in FIGS. 1 and 4A to propose likely bounding boxes as well as class labels.

In some examples, the method for building a dataset is user supervised such that a user can rapidly inspect computer estimates and validate signal bursts, for example, by approving or disapproving generated and/or added annotations to provide corrections as needed. This user supervised method is a less cumbersome task than manual entry of dataset. In some cases, labels may also be estimated for the signal bursts using either manual entry, or a wide range of automated techniques which may include the processing unit 506 clustering features extracted from the signal bursts, clustering raw data included within the signal bursts or compressed forms thereof, classification using existing neural networks or signal classifiers, or distance metrics and/or manual display and curation of various representations of the signals and/or desired target class examples.

The system 500 allows for wide-band signal sensing, segmentation, and detection at a speed orders of magnitude faster and at a lower power level than other methods. Due to its possibility of having a small size and footprint, the system 500 can be easily mounted and deployed on buildings, vehicles, small or large UAVs, or other difficult portable platforms, and may operate from limited battery power for extended periods of time. Many other configurations are possible using various embedded processors, graphics processors, neuromorphic processors, tensor or vector accelerators, different software radio frontends, for instance. The output data describing bursts may be used to perform one or more of RF anomaly detection, change detection, localization of emitters, mapping of emitters, behavior monitoring on emitters, or detection of emitters representing threats or interesting events in the corresponding physical world, for example. Various processing techniques can be performed on the compact emission description data to accomplish one or more of the goals listed above.

Figure 6:
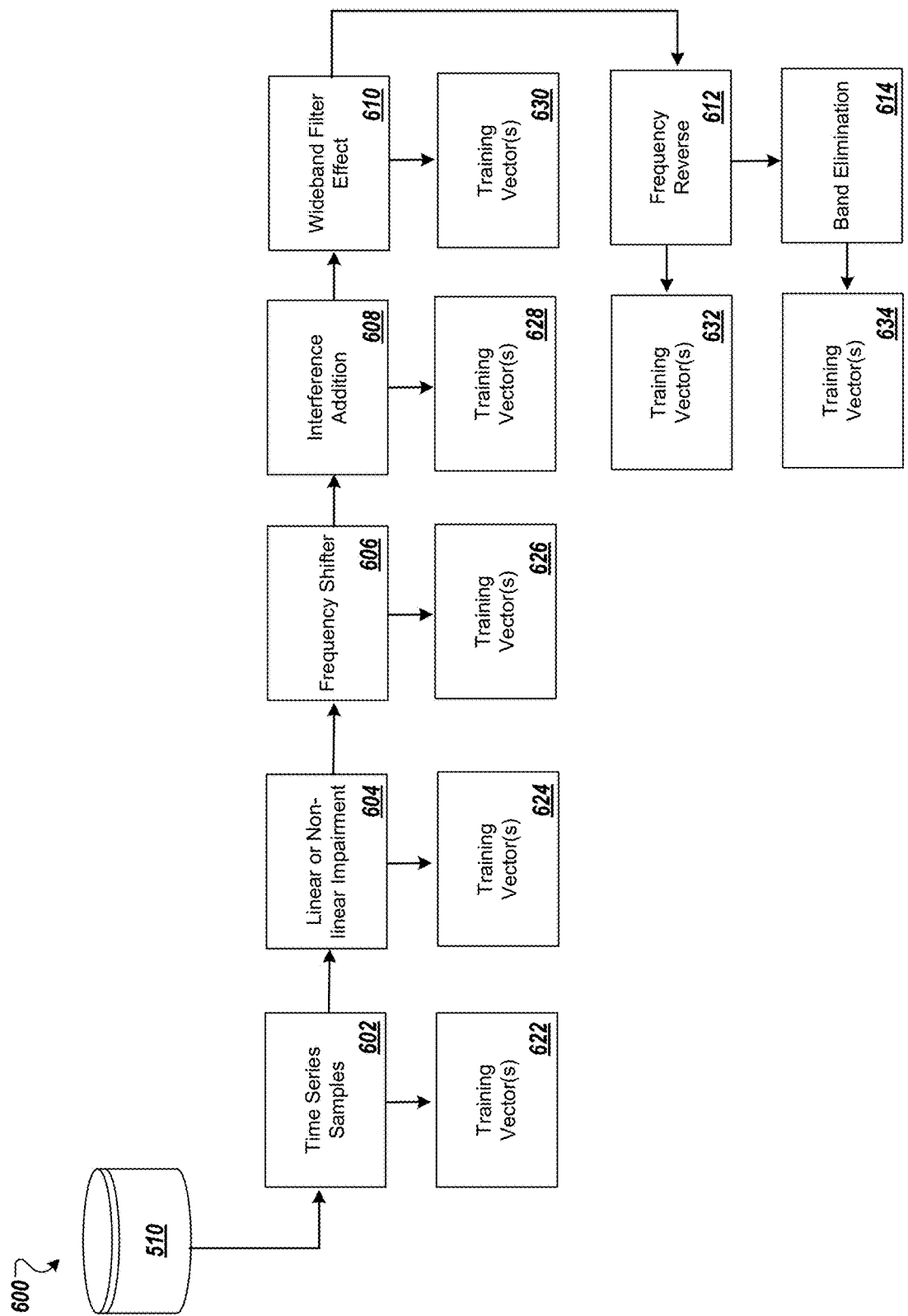
FIG. 6 illustrates an example augmentation routine.

FIG. 6 illustrates an example augmentation routine 600. The augmentation routine 600 creates unique time-series vectors from one or more time series samples 602 for training one or more machine learned models. The augmentation routine 600 increases the size of the training dataset as well as generalizes models to new electromagnetic environments and analog front-ends with different components.

In the described example, one or more time series samples 602 are varied in order to generate unique training vectors 624, 626, 628, 630, 632, and/or 634 for one or more ML models to account for different hardware systems, e.g., used by a customer. For example, the training vectors 624, 626, 628, 630, 632, and/or 634 may be generated through the augmentation routine 600 in order to account for particular antennas or radio receivers that can operate in different geographical areas, or with differing band plans and propagation conditions.

In the augmentation routine 600, the one or more time series samples 602 are loaded from the data storage 510 to create one or more training vectors 622. The augmentation routine 600 includes performing a number of operations on the one or more time series samples 602 to generate one or more other training vectors 624, 626, 628, 630, 632, and/or 634. For example, as shown, the operations include a linear or non-linear impairment 604, a frequency shifter 606, an interference addition 608, a wideband filter effect 610, a frequency reverse 612, and a band elimination 614.

The one or more training vectors 624 are produced as a result of applying the linear or non-linear impairment 604 to the one or more time series samples 602. The linear or non-linear impairment 604 may include a resampling (rate change) including interpolation, upsampling, and/or downsampling. The linear or non-linear impairment 604 may also include a wide range of simulated, approximated, or real hardware effects such as those for amplifier distortion, sample clipping from saturating an ADC, RF Compression, RF intermodulation or aliasing, the introduction of hardware interference such as cross-talk or oscillator peaks, for instance.

The one or more training vectors 626 are produced as a result of applying the frequency shifter 606 to the one or more time series samples 602 or to the output of the linear or non-linear impairment 604. The one or more training vectors 626 generalize the model to multiple tuner configurations, for example, including various frequency offset distances or clock stability ratings. As an example, the frequency shifter 606 could be a numerically-controlled oscillator (NCO) with fixed or drifting control or coordinate-rotation around the complex plane, or simply rotated examples of the input signal at randomly drawn frequency offsets.

The one or more training vectors 628 are produced as a result of applying the interference addition 608 to the one or more time series samples 602 or to the output of the frequency shifter 606. The one or more training vectors 628 may include interference such as additive white Gaussian noise, colored noise, or superimposed signals, which may be simulated or drawn from other training examples.

The one or more training vectors 630 are produced as a result of applying the wideband filter effect 610 to the one or more time series samples 602 or to the output of the interference addition 608. The one or more training vectors 630 generalize the trained model to different analog filter configurations. For example, the wideband filter effect 610 may simulate the filter roll-off or frequency selective behavior of the radio front-end for various devices that may include different filter device hardware, configurations, or performance.

The one or more training vectors 632 are produced as a result of applying the frequency reversal 612 to the one or more time series samples 602 or to the output of the wideband filter effect 610. The one or more training vectors 632 which alter the band layout by flipping the time-frequency representation on the frequency axis, for example, by taking the conjugate of the time series signal.

The one or more training vectors 634 are produced as a result of applying the band elimination 614 to the one or more time series samples 602 or to the output of the frequency reversal 612. The one or more training vectors 634 which use a combination of noise either generated or sampled from noisy time-frequency space in the example and filters to remove signals from appearing by pushing them below the noise floor. The band elimination 614 may improve the generalization of a detector to recognize any region of a signal emission, for example, by allowing the detector to rely on a feature fit to any one specific region of the emission.

The generated training vectors 622, 624, 626, 628, 630, 632, and/or 634 may be used to train one or more machine learning models. For example, one or more of the generated training vectors 622, 624, 626, 628, 630, 632, and 634 may be used to train a neural network of the convolution classifier 114 shown in FIGS. 1 and 3. Similarly, one or more of the generated training vectors 622, 624, 626, 628, 630, 632, and 634 may be used to train machine learning model for time and frequency bound estimation.

In some implementations, the generated training vectors 624, 626, 628, 630, 632, and/or 634 are generated for a specific electromagnetic environment in which a machine learning model is to be deployed. For example, the generated training vectors 624, 626, 628, 630, 632, and/or 634 may be generated to account for a specific sample rate required of the environment, and/or the harshness of the environment (e.g., the reflectivity of the environment). As an example, one or more of the generated training vectors 624, 626, 628, 630, 632, and 634 may be generated for a harsh environment such as an aerial environment.

In some implementations, the generated training vectors 624, 626, 628, 630, 632, and/or 634 are generated for specific hardware effects or hardware components (e.g., analog components) that are to be used in deploying a machine learning model, such as particular radio receivers and/or antennas. For example, the generated training vectors 624, 626, 628, 630, 632, and/or 634 may be generated to account for clipping, channel clips, band changes, sample rates, and the like. As an example, one or more of the generated training vectors 624, 626, 628, 630, 632, and 634 may be generated to account for the sampling rate for a particular radio receiver. The one or more training vectors may then be used to train a machine learning model that is to be deployed on a system that includes that particular receiver.

Alternatively or in addition, signals may be augmented by the superposition of multiple signals, the synthesis of new wide-band signal scenarios from bursts either simulated or composed from one or more real signal recordings, the introduction of new propagation effects such as fading patterns, interference effects, mobility models, ray tracing models, or a wide range of other signal processing routines designed to vary the signals in ways that occur randomly in real world systems. In order to select the suitable set of augmentation strategies for one or more radio signal bands while training, random subsets and parameterizations of the augmentation routines may be used. In order to select a target augmentation strategy, a validation loss may be evaluated for a machine learned model trained using the augmented version of a training set. By performing a search strategy over the augmentation steps and parameters in order to maximize the performance of the test or validation set, a target augmentation strategy may be devised. The target augmentation strategy may provide a goal performance and generalization in the resulting system, e.g., the system 100 shown in FIG. 1 or the system 500 shown in FIG. 5.

In some implementations, not all of the operations 604, 606, 608, 610, 612, and 614 need to be performed. Accordingly, in some implementations, the training data for one or more ML models can be generated using one or more, but not all, of the training vectors 622, 624, 626, 628, 630, 632, or 634.

Figure 7:
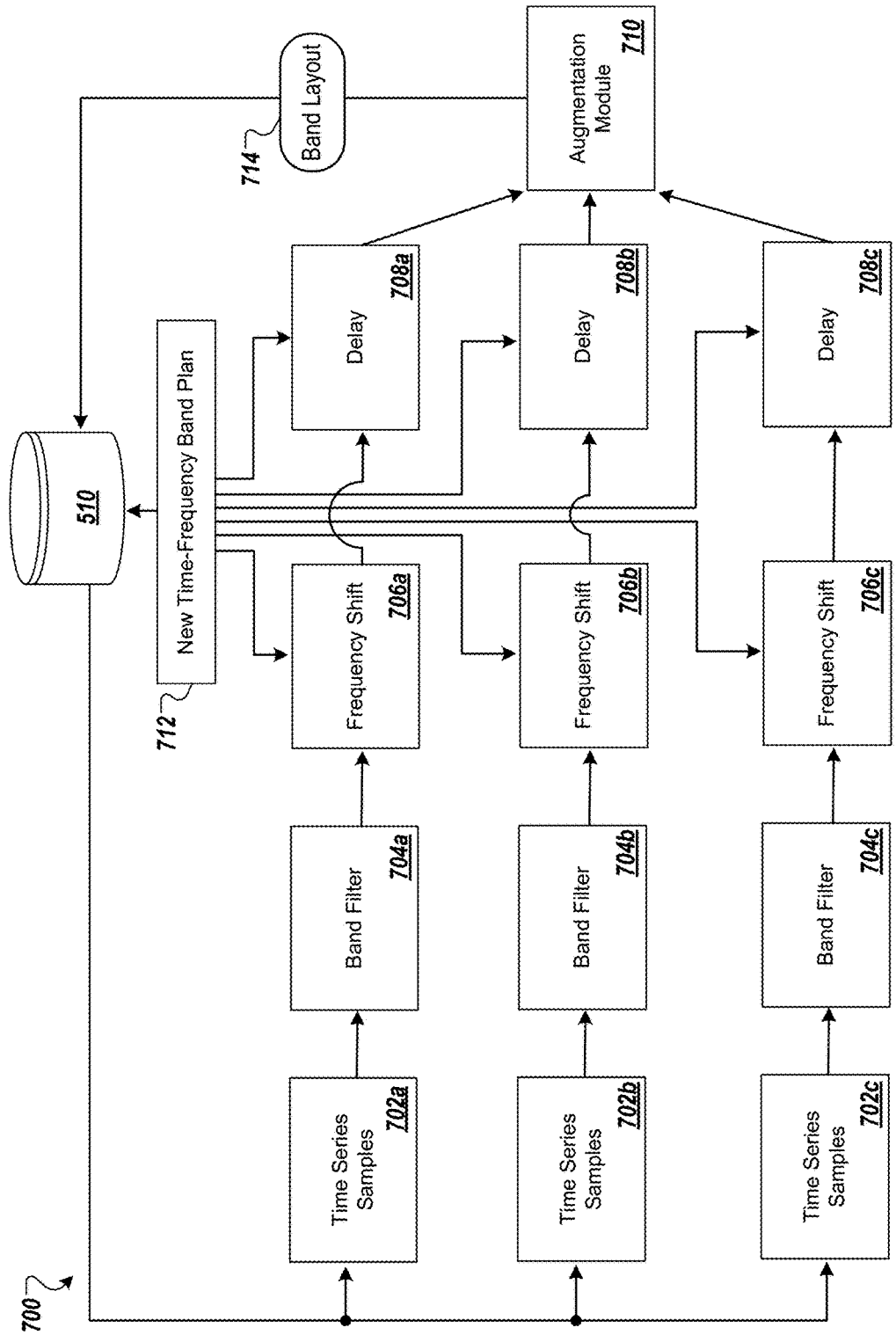
FIG. 7 illustrates an example augmentation routine.

FIG. 7 illustrates an example augmentation routine 700. The augmentation routine 700 creates new band plans by combining selectively filtered signals from an annotated dataset into new files. In addition, the augmentation routine 700 helps generalize a ML model to new electromagnetic environments and prevent overfitting to the frequency allocation of a geographical area.

As shown, in the augmentation routine 700, multiple files from recordings at one or more frequencies, specifically time series samples 702a-702c, are read from the data storage 510. One or more of the time series samples 702a-702c may be recorded signals from real world propagation. One or more of time series samples 702a-702c may be simulated signals and/or propagation effects.

In the augmentation routine 700, the band filters 704a-706c can be applied to the time series samples 702a-702c. By applying a band filter to one of the time series samples, a sub-portion of the corresponding sample bandwidth is selected. Specifically, a first band filter 704a is applied to the first one or more time series samples 702a, a second band filter 704b is applied to the second one or more time series samples 702b, and a third band filter 704c is applied to the third one or more time series samples 702c.

In the augmentation routine 700, each of the sub-portions of the time series samples 702a-702c outputted by the band filters 704a-704c respectively undergo a corresponding frequency shift 706a-706c accordingly to a new time-frequency band plan 712.

In the augmentation routine 700, each of time delays 708a-708c are applied to a corresponding one of the frequency-shifted, sub-portions of the time series samples 702a-702c accordingly to the new time-frequency band plan 712.

In the augmentation routine 700 includes providing the output of each of the time delays 708a-708c to an augmentation module 710 that sums or combines the outputs and creates a new band layout vector 714, where the outputs are the time-delayed, frequency-shifted sub-portions of the time series samples 702a-702c. The outputs may be combined in such a way so that the new band layout vector 714 does not exist in any of the current training data. For example, the new band layout vector 714 may include signals recorded over the air that did not appear within the same sampled bandwidth, e.g., the time series samples 702a-702c. In this way, new training examples can be created, e.g., the new band layout vector 714 may be used to train one or more machine learning models described herein.

In some implementations, the outputs are combined in such a way to create training examples that are used in the real world, but that are impossible to annotate correctly. For example, the signals may be interfering signals.

The logic for combining the outputs to generate the new band layout vector 714 may be completely uniformed. Alternatively, the output for combining the outputs to generate the new band layout vector 714 may be based on SPC rules or channelization schemes. This process may be used to create training examples that are used in real world, but impossible to annotate correctly The new band layout vector 714 may be stored on the data storage 510 and may be used for training the ML model. The newly generated band layout 712 vector enables generalization of the ML model determined by fitting a band plan from a particular geographical area.

Additional augmentation techniques such as any of those described above with respect to FIG. 6 may be applied here. For example, propagation effects such as fading, carrier frequency and phase, timing, and sample rate variations may be introduced to the example signals to further create variance and generalization performance within the training process.

Figure 8:
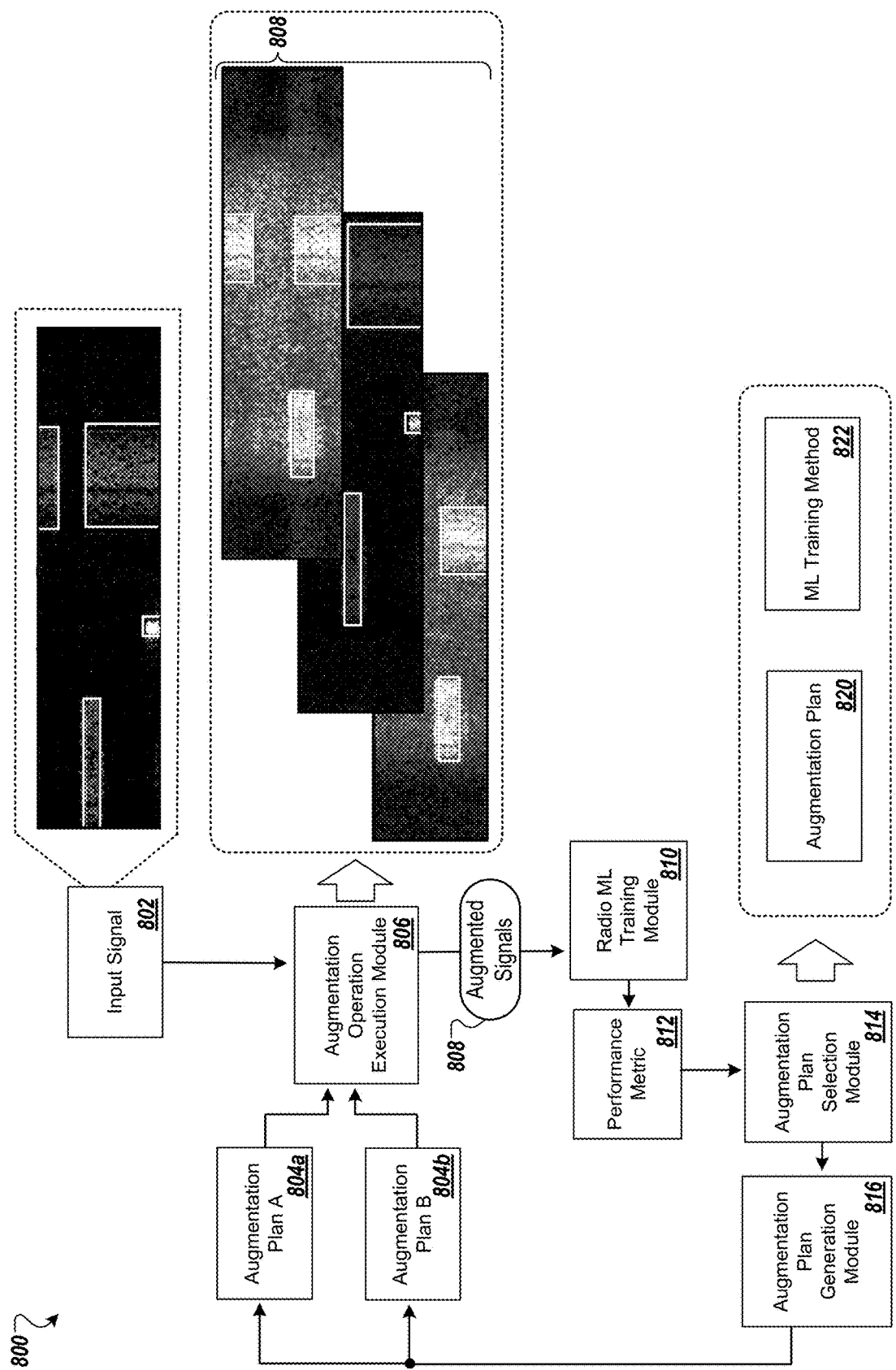
FIG. 8 illustrates an example system and process for augmenting radio frequency training data.

FIG. 8 illustrates an example system 800 and process for augmenting radio frequency training data. The system 800 includes an augmentation operation execution module 806, a radio ML training module 810, an augmentation plan selection module 814, and an augmentation plan generation module 816. In some implementations, the system 800 is or is part of the system 100 shown in FIG. 1. In some implementations, the system 800 is or is part of the system 500 shown in FIG. 5.

The process for augmenting radio frequency data includes receiving an input signal 802, producing augmented signals 808, and producing ML models with suitable performance metrics operations for receiving input signals, producing augmented signals, and producing ML models with the suitable performance metrics.

The example of FIG. 8 shows multiple candidate augmentation plans, a first augmentation plan 804a ("Plan A") and a second augmentation plan 804b ("Plan B"). The augmentation plans 804a-804b may be produced either manually or through the augmentation plan generation module 816.

In some implementations, the augmentation plans 804a-804b are determined randomly, for example, by generation of random operations and parameters for the operations.

In some implementations, the augmentation plans 804a-804b are determined by a search process, a genetic algorithm, or other method for producing augmentation plans. For example, an augmentation operation execution module 806 may take the input signal 802, and produce multiple augmented signals 808 through a sequence of one or more augmentation operations. These augmentations operations may include the operations within the augmentation routine 600 shown in FIG. 6, or the operations within the augmentation routine 700 shown in FIG. 7. In some examples, the augmentation operations may also include any kind of signal processing operation, stochastic selection of operations, or other algorithm generally designed to model channel effects.

In some implementations, the augmentation plans 804a-804b include a sequence of operations. For example, the augmentation plan 804a may include the following sequence of operations:

```
augmode = [
        {"op":"rotate","sigma":0.25},
        {"op":"somtimes","p":0.5, "ops":[
        {"op":"interp","rate":[0.9,1.2]}
        ]},
        {"op":"somtimes","p":0.5,"ops":[
            {"op":"choice","options":[
                {"op":"rayleigh","ntaps":4},
                {"op":"rayleigh","ntaps":8},
            ]}
        ]},
        {"op":"somtimes","p":0.9, "ops":[
            {"op":"normalize"},
            {"op":"awgnRLUP","range":[0.001,0.3]}
        ]}
    ]
```

As another example, the augmentation plan 804b may include the following sequence of operations:

```
augmode = [
        {"op":"somtimes","p":0.5,"ops":[ {"op"
        "interp","rate":[2,2]}
        {"op":"rotateRU","range":[−0.25,0.25]}
        {"op":"interp","rate":[0.5,0.5]}
        ]},
        {"op"":"somtimes","p":0.5,"ops":[
            {"op":"interp","rate":[0.9,1.2]}
        ]},
        {"op":"somtimes","p":0.5,"ops":[
            {"op":"choice","options":[
                {"op":"rayleigh","ntaps":2},
                {"op":"rayleigh","ntaps":4},
            ]}
        ]}
        {"op":"awwgnSNR"}
]
```

As shown, the sequence of operations include "interp" for rate interpolation/resampling by a random rate change, "rotate" for mixing with a carrier frequency of a random rate, "sometimes" to indicate conditional execution of suboperations with probability "p", "Rayleigh" to indicate convolution with a set of random Rayleigh channel fading taps, and "awgnRLUP" to indicate additional of additive white Gaussian noise with random log-uniform power over some distribution. There may be additional operations included in the augmentation plans 804a-804b and the augmentation execution process to simulate one or more subsets of channel conditions.

In some examples where the augmentation operations are stochastic (e.g., sometimes suboperations, or random values within operation parameters), augmentations are different for each execution. Three output augmented signals 808 are shown as the output of the augmentation operation execution module 806.

The system 800 may use one or more of the augmented signals 808 to train a radio ML model through a radio ML training module 810. For instance, the training may utilize a gradient descent or Adam optimizer executed on a neural network such as a convolutional network, recurrent network, or any of other network models described above in FIGS. 3, and 4A-4B.

The system 800 may evaluate the trained ML network may in order to determine the performance of the network by generating one or more performance metrics 812. For example, the performance metrics 812 may include one or more of detection accuracy, classification accuracy, bit error rate, mean-average precision (mAP), Intersection over Union (IoU), or many other application specific performance metrics.

The augmentation plan selection module 814 may then use the performance metrics 812 generated by the system 800 in selecting an augmentation plan 820. For example, the augmentation plan selection module 814 may use the performance metrics 812 to choose the augmentation plan 820 because it is an augmentation plan that has produced a ML model that satisfies a goal performance. The augmentation plan selection module 814 may also use the performance metrics 812 to select a training method 822. The training method 822 may be an ML training method for a ML model. In some examples, the augmentation plan 820 and training method 822 may be selected and used for training, deployment, or other future use.

In some implementations, in selecting the augmentation plan 820, the augmentation plan selection module 814 takes into account a specific electromagnetic environment in which a machine learning model is to be deployed. For example, in selecting the augmentation plan 820, the augmentation plan selection module 814 may take into account the specific sample rate required of the environment, and/or the harshness of the environment (e.g., the reflectivity of the environment, whether it is an aerial environment, or the like). Similarly, in selecting the augmentation plan 820, the augmentation plan selection module 814 takes into account the specific hardware effects or hardware components (e.g., analog components) that are to be used in deploying a machine learning model. For example, in selecting the augmentation plan 820, the augmentation plan selection module 814 may take into account the particular radio receivers and/or antennas, and/or expected clipping, channel clips, band changes, sample rates, and the like.

The augmentation plan generation module 816 may take the performance metrics 812 or the selected augmentation plans from one or more iterations, e.g., including the augmentation plan 820, to produce one or more new augmentation plans for use in the same cycle. In such a process, a genetic algorithm or other search algorithm may be used along with a generator for derivative plans to iteratively improve the augmentation plan 820 and improve the performance and generalization of the models.

In some implementations, the input signal 802 may also include input annotations (e.g., a band plan describing the contents of the signal). The augmentation operation execution module 806 may augment both the input signal 802 (e.g., time samples, or spectrogram values) and the annotation values corresponding to a random stochastic behavior of the input signal 802. For instance, if a signal is mixed to a new frequency, annotations are also updated by that operation to track the augmentation of model inputs and model targets (e.g., for detection). Resampling operations, may resample the input signal 802, but also provide updates to the annotations specifying the new relative rates, timing, frequency edges, or other properties of the annotations within the resampled signal.

In some implementations, the system 800 selects between the augmentation plan 804a and the augmentation plan 804b in deciding which augmentation plan to implement. In selecting between the augmentation plans 804a-804b, the system 800 may take into account the electromagnetic environment, and/or the specific hardware effects or hardware components as described herein.

Figure 9:
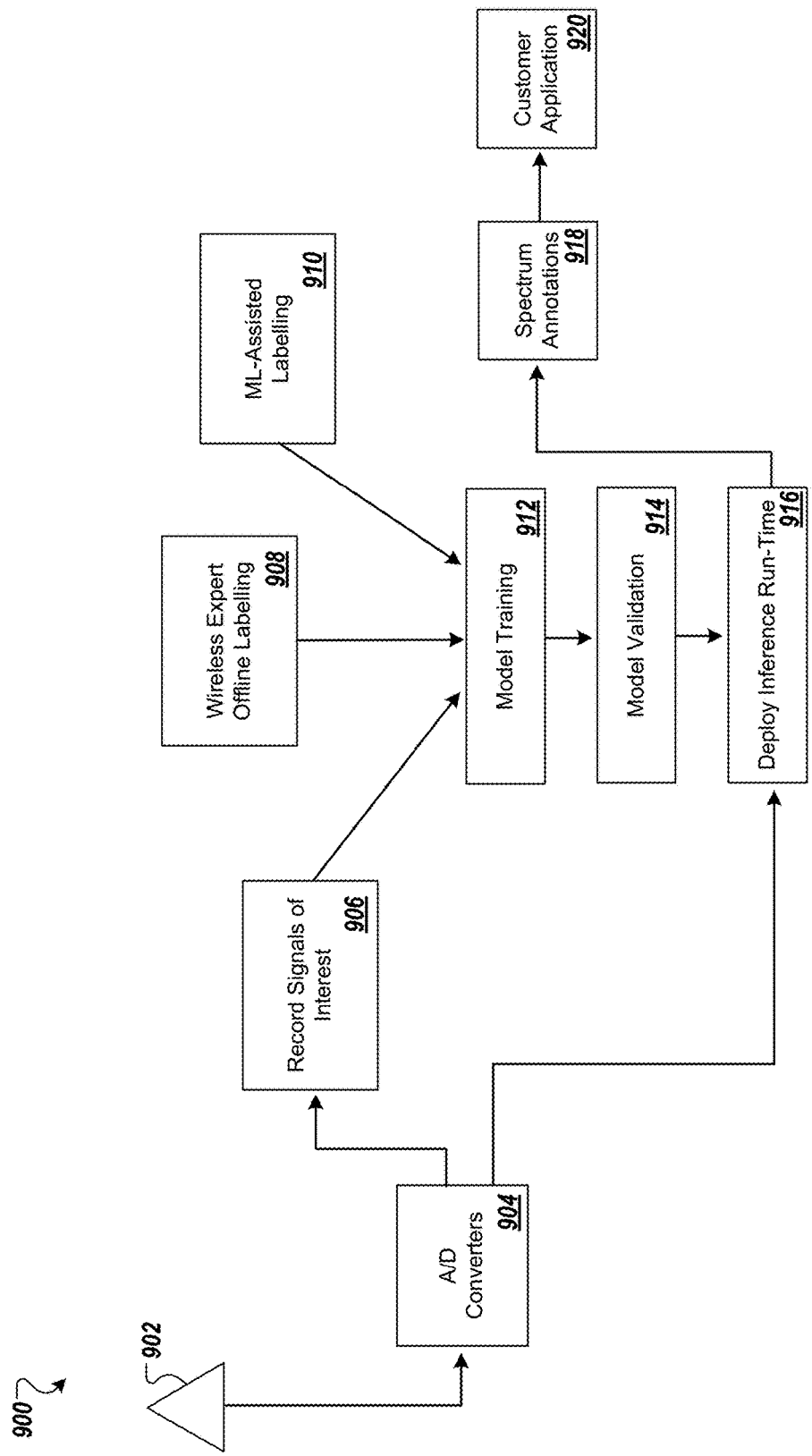
FIG. 9 illustrates an example system for learning and deploying radio frequency band segmentation, and signal detection and labelling.

FIG. 9 illustrates an example system 900 for learning and deploying radio frequency band segmentation, and signal detection and labelling. The system 900 includes an antenna 902 and one or more ADCs 904. The system 900 can be used for training one or more ML models and deployment of those ML models. In some implementations, the system 900 is the system 100 shown in FIG. 1. In some implementations, the system 900 is the system 500 shown in FIG. 5. In some implementations, the system 900 is the system 800 shown in FIG. 8.

The system 900 may obtain energy such as radio waves or signals through the antenna 902. This energy is then passed to the one or more ADCs 904. The ADCs 904 may convert the received energy from an analog signal to a digital, time-domain signal. The ADCs 904 may transform the time-domain signal into a time-frequency representation.

Signals of interest within the energy are recorded (906) and passed to model training 912. The model training 912 may be training model that is used to train prediction for raw data. The model training 912 may also receive wireless expert offline labelling 908. The wireless expert offline labelling 908 may server as ground truth. The model training 912 may also receive learning assisted labelling 910, e.g., labelling automatically generated by one or more ML models. Together, the wireless expert offline labelling 908 and the learning assisted labelling 910 may be used to identify the type or class for each of the signals present in the recorded signals of interest, a time bounds for each of the signals present, a frequency bounds for each of the signals present, and/or a probability that the signals are of the correct type for each of the signals present.

The output of the model training 912 is provided to model validation 914. The model validation 914 determines how well the model performs. For example, the model validation 914 may use techniques similar to that used with generating and using the performance metrics 812 shown in FIG. 8.

The ADCs may deploy an inference model run-time (916) to generate spectrum annotation 918. The spectrum annotations 918 may indicate the type or class of signals present in the recorded signals of interest, a time bounds for the signals present, a frequency bounds for the signals present, and/or a probability that the signals are of the correct type.

Once the spectrum annotations 918 have been generated, they may be provided to a customer application 920, or to storage, a network bus, an analytics engine, or other sort of application which uses the annotations which may take some further action or response.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by at least one processor, the method comprising:
   receiving, from one or more radio frequency (RF) communication receivers, a sample of electromagnetic energy processed by the one or more RF communication receivers;
   examining the sample of electromagnetic energy to detect one or more RF signals present in the sample; and
   in response to detecting one or more RF signals present in the sample:
      extracting the one or more RF signals from the sample,
      generating time-frequency bins by estimating time and frequency bounds for each of the one or more RF signals,
      classifying, for the time-frequency bins, at least one of a signal type being present, or a likelihood of being present, in at least a plurality of time-frequency bins, the classifying comprising obtaining a signal class probability for each of the plurality of time-frequency bins indicating a signal type being present or likelihood of being present in the time-frequency bin,
      clustering, based on the signal class probabilities, the plurality of time-frequency bins into one or more bounding boxes having a time dimension and a frequency dimension, each bounding box representing a contiguous portion of a time-frequency region that includes least one RF signal of a signal type corresponding to a time-frequency bin, and
      displaying, on a user interface of an electronic device coupled to the at least one processor, (i) representations of the one or more bounding boxes and (ii) an adjacent table comprising entries providing information on the displayed representations of the one or more bounding boxes, wherein at least one entry in the table corresponds to a bounding box of the one or more bounding boxes, the at least one entry comprising a first field displaying one or more signal types associated with the respective bounding box, a second field displaying one or more frequency values corresponding to the one or more signal types associated with the respective bounding box, a third field displaying a bandwidth corresponding to the one or more signal types associated with the respective bounding box, and a fourth field displaying a received signal strength indicator (RSSI) associated with the respective bounding box.

2. The method of claim 1, wherein estimating time and frequency bounds for each of the one or more RF signals comprises:
   transforming the sample of electromagnetic energy from a time-series representation to a time-frequency representation;
   determining the time bounds for each of the one or more RF signals based on the time-frequency representation; and
   determining the frequency bounds for each of the one or more RF signals based on the time-frequency representation.

3. The method of claim 2, wherein transforming the sampled energy from a time-series representation to a time-frequency representation comprises computing at least one of a fast Fourier transform (FFT), a digital Fourier transform (DFT), or a wavelet transform with the sampled energy.

4. The method of claim 2, wherein classifying at least one of a signal type being present or likelihood of being present comprises:
   comparing one or more of the time bounds or frequency bounds of each of the one or more RF signals with signal classification data;
   based on the comparing, determining that an RF signal of the one or more RF signals corresponds to one of one or more known signal types; and
   classifying the RF signal as corresponding to the one or more known signal types.

5. The method of claim 2, further comprising:
   annotating, for a time-frequency bin, at least one of the time-series representation or the time-frequency representation of an RF signal corresponding to the time-frequency bin with the at least one of a signal type being present or likelihood of being present; and
   storing the annotated representation.

6. The method of claim 1, wherein classifying at least one of a signal type being present or likelihood of being present comprises classifying at least one of a signal type being present, or a likelihood of being present in at least the plurality of time-frequency bins using a machine learning model.

7. The method of claim 1, wherein clustering the plurality of time-frequency bins into the one or more bounding boxes comprises generating the one or more bounding boxes based on output of a neural network that receives the signal class probabilities as input.

8. The method of claim 1, further comprising labelling each of the one or more bounding boxes with the corresponding one or more types.

9. The method of claim 1, wherein clustering the plurality of time-frequency bins into the one or more bounding boxes having a time dimension and a frequency dimension based on the signal class probabilities comprises determining the likelihood of a signal type being present for each of the one or more bounding boxes, wherein a likelihood for a bounding box indicates that the bounding box correctly represents a type of signal.

10. The method of claim 9, further comprising labelling each of the one or more bounding boxes with the corresponding likelihood.

11. The method of claim 1, wherein classifying at least one of a signal type being present or likelihood of being present comprises, for each of the one or more RF signals:
   comparing the time bounds and the frequency bounds of the RF signal with the one or more bounding boxes;
   determining that the time bounds and the frequency bounds of the signal are within a threshold range of a bounding box of the one or more bounding boxes; and
   in response to the determination, classifying the signal as at least one of a signal type of RF signal corresponding to the bounding box, or with a likelihood of a signal type present corresponding to the bounding box.

12. The method of claim 1, wherein the contiguous portion of the time-frequency region represented by each bounding box includes a plurality of RF signals of a particular signal type corresponding to a plurality of time-frequency bins in each bounding box, the method further comprising:
   determining a single class probability for the one or more bounding boxes based on the class probabilities of the plurality of time-frequency bins corresponding to the particular signal type.

13. The method of claim 1, wherein the contiguous portion of the time-frequency region represented by each bounding box includes a plurality of RF signals of a plurality of signal types corresponding to the plurality of time-frequency bins in each bounding box, the method further comprising:
  determining a probability distribution for the one or more bounding boxes based on class probabilities of the plurality of time-frequency bins corresponding to the plurality of signal types.

14. The method of claim 1, wherein clustering the plurality of time-frequency bins into the one or more bounding boxes comprises:
  for each signal type being present or having a likelihood of being present:
    determining one or more time-frequency bins in which the signal type is present or has a likelihood of being present;
    associating a bounding box with the signal type; and
    clustering the determined one or more time-frequency bins into the associated bounding box.

15. The method of claim 1, wherein displaying representations of the one or more bounding boxes on the user interface of the electronic device further comprises:
  receiving an input selecting a displayed representation of a bounding box to adjust one or more dimensions of the displayed representation; and
  adjusting one or more dimensions of the selected representation in accordance with the input.

16. The method of claim 1, wherein the at least one entry in the table further comprises a field displaying one or more time coordinates corresponding to a position of the respective bounding box in the time-frequency region comprising the one or more bounding boxes.

17. The method of claim 1, wherein the second field displaying the one or more frequency values comprises displaying a plurality of numerical frequency edge values indicating a position in the time-frequency region of at least one RF signal corresponding to the respective bounding box.

18. A system comprising:
  one or more processors; and
  one or more computer-readable media storing instructions that, when executed, cause the one or more processors to perform operations comprising:
    receiving a sample of electromagnetic energy from a radio frequency (RF) communication receiver;
    examining the sample of electromagnetic energy to detect one or more RF signals present in the sample; and
    in response to detecting one or more RF signals present in the sample:
      generating time-frequency bins by estimating time and frequency bounds for each of the one or more RF signals,
      classifying, for the time-frequency bins, at least one of a signal type being present, or a likelihood of being present, in at least a plurality of time-frequency bins, the classifying comprising obtaining a signal class probability for each of the plurality of time-frequency bins indicating a signal type being present or likelihood of being present in the time-frequency bin,
      clustering, based on the signal class probabilities, the plurality of time-frequency bins into one or more bounding boxes having a time dimension and a frequency dimension, each bounding box representing a contiguous portion of a time-frequency region that includes least one RF signal of a signal type corresponding to a time-frequency bin, and
      displaying, on a user interface of an electronic device coupled to the one or more processors, (i) representations of the one or more bounding boxes and (ii) an adjacent table comprising entries providing information on the displayed representations of the one or more bounding boxes, wherein at least one entry in the table corresponds to a bounding box of the one or more bounding boxes, the at least one entry comprising a first field displaying one or more signal types associated with the respective bounding box, a second field displaying one or more frequency values corresponding to the one or more signal types associated with the respective bounding box, a third field displaying a bandwidth corresponding to the one or more signal types associated with the respective bounding box, and a fourth field displaying a received signal strength indicator (RSSI) associated with the respective bounding box.

19. The system of claim 18, the system further comprising:
  the RF communication receiver; and
  an antenna coupled to the RF communication receiver, wherein the electromagnetic energy impinged the antenna.

20. The system of claim 18, wherein the one or more processors include a machine learning model that is trained using at least one of sampled electromagnetic energy from the RF communication receiver, or simulated energy samples from a signal environment simulator.

21. The system of claim 18, wherein estimating time and frequency bounds for each of the one or more RF signals comprises:
  transforming the sample of electromagnetic energy from a time-series representation to a time-frequency representation;
  determining the time bounds for each of the one or more RF signals based on the time-frequency representation; and
  determining the frequency bounds for each of the one or more RF signals based on the time-frequency representation.

22. The system of claim 18, wherein displaying representations of the one or more bounding boxes on the user interface of the electronic device further comprises:
  receiving an input selecting a displayed representation of a bounding box to adjust one or more dimensions of the displayed representation; and
  adjusting one or more dimensions of the selected representation in accordance with the input.

* * * * *

UNITED STATES PATENT AND TRADEMARK OFFICE
CERTIFICATE OF CORRECTION

| | | |
|---|---|---|
| PATENT NO. | : 12,373,715 B2 | Page 1 of 1 |
| APPLICATION NO. | : 16/676229 | |
| DATED | : July 29, 2025 | |
| INVENTOR(S) | : Nathan West et al. | |

It is certified that error appears in the above-identified patent and that said Letters Patent is hereby corrected as shown below:

In the Claims

Column 23, Line 30 (Approx.), In Claim 1, after "includes" insert -- at --.

Column 24, Line 62, In Claim 12, delete "single" and insert -- signal --.

Column 26, Line 6 (Approx.), In Claim 18, after "includes" insert -- at --.

Signed and Sealed this
Twenty-third Day of September, 2025

John A. Squires
*Director of the United States Patent and Trademark Office*